United States Patent [19]

Pallante

[11] Patent Number: 4,632,277
[45] Date of Patent: Dec. 30, 1986

[54] BULK MELTER HAVING DRUM HOLD-DOWN DEVICE

[75] Inventor: Richard M. Pallante, Norcross, Ga.

[73] Assignee: Nordson Corporation, Amherst, Ohio

[21] Appl. No.: 632,490

[22] Filed: Jul. 19, 1984

[51] Int. Cl.[4] .............................................. B67D 5/62
[52] U.S. Cl. ................................ 222/146.2; 248/154; 269/254 CS
[58] Field of Search ............ 222/146 R, 146 H, 146.2, 222/146.5, 173, 184; 248/146, 154, 499; 274/90; 269/254 CS, 287

[56] References Cited

U.S. PATENT DOCUMENTS

| 268,416 | 12/1882 | Lane | 248/154 |
| 2,550,019 | 4/1951 | Murphy | 248/154 |
| 3,091,342 | 5/1963 | Crump | 248/154 |
| 3,637,111 | 1/1972 | McCreary | 222/146.2 |
| 4,073,409 | 2/1978 | Gardner et al. | 222/146.5 |
| 4,240,567 | 12/1980 | Gardner | 222/146.3 |

FOREIGN PATENT DOCUMENTS 462377 7/1928 Fed. Rep. of Germany ...... 269/254 CS

Primary Examiner—Joseph J. Rolla
Assistant Examiner—Kenneth Noland
Attorney, Agent, or Firm—Wood, Herron & Evans

[57] ABSTRACT

Apparatus for melting and dispensing solid thermoplastic material directly from a drum. The apparatus includes a base plate, a platen assembly mounted above the base plate, and fluid motors for effecting vertical movement of the platen assembly relative to the base plate. The platen assembly includes a follower, a heating platen located beneath the follower, and a pump for pumping molten thermoplastic material from the underside of the follower as the platen assembly is lowered into a drum supported atop the base plate. A drum hold-down mechanism is mounted on the top side of the base plate and is engageable with a drum supported upon the base plate so as to prevent the drum from lifting up off of the base plate as the platen assembly is lifted out of the drum. The hold-down mechanism includes a pair of hold-down plates spring biased into engagement with opposite sides of the drum, which hold-down plates have tapered leading edges engageable with the drum as the drum is inserted between the mounting plates so as to guide the drum between the plates and cam the plates apart against the spring bias.

1 Claim, 4 Drawing Figures

BULK MELTER HAVING DRUM HOLD-DOWN DEVICE

This invention relates to thermoplastic melting and dispensing apparatus and more particularly, apparatus for melting and pumping thermoplastic material directly from a shipping drum or barrel. Commonly such devices include an arrangement for lowering a platen assembly comprising a follower, a heating platen located beneath the follower, and a pump, directly into the open top of the shipping drum. The heating platen is operable to melt the solid thermoplastic material in the region directly below the platen so as to convert that thermoplastic material into a liquid state for delivery to the pump. The pump in turn supplies the molten material to a dispenser located remote from the drum.

Commonly, bulk melting and dispensing apparatus of the type described hereinabove includes a seal about the periphery of the follower plate, which seal is engageable with the interior surface of the drum so as to pressurize the molten thermoplastic material located beneath the follower as the platen assembly is forced downwardly into the drum. Thereby, that thermoplastic material located beneath the follower, which had been converted to a molten state by the heater of the platen assembly, is forced into the inlet of the pump.

The drum containing the thermoplastic material is commonly supported upon a base plate which may either be moved upwardly relative to the stationary platen assembly or may be maintained stationary relative to the platen assembly as the platen assembly is moved downwardly relative to the base plate.

A more complete description of bulk thermoplastic material melting and dispensing apparatus of the type described hereinabove may be found in U.S. Pat. Nos. 4,073,409 and 4,240,567.

A common problem encountered with bulk melters of the type described hereinabove is that of removing the drum from the platen assembly after a pumping cycle has been completed or after the drum has been emptied. The seal located about the periphery of the follower plate generally maintains a tight fit with the interior surface of the drum. Consequently, as the platen assembly is lifted from the drum, particularly if the drum is empty and light, the drum tends to lift upwardly with the platen assembly rather than remaining fixed atop the drum supporting base plate. When this occurs, the practice heretofore has been to simply grab the top edge of the drum and try to manually force the drum off of the platen. This is often a difficult and time consuming process.

It has therefore been an objective of this invention to provide a relatively simple and inexpensive mechanism for holding the drum downwardly upon the base plate as the platen assembly of a bulk melter is lifted from the interior of the drum.

This objective is achieved and this invention is predicated upon the provision of a pair of spring biased movable hold-down plates mounted atop the base plate and engageable with opposite sides of the drum. Each of these hold-down plates is movably mounted relative to a fixed mounting plate secured to the top of the base plate. Compression springs are located between the mounting plates and hold-down plates so as to bias the hold-down plates to an extended position in which the hold-down plates contact the exterior peripheral surface of the drum above a bottom flange on the drum. When the drum attempts to lift upwardly relative to the base plate, the lower edges of the hold-down plates engage the bottom flange of the drum and prevent the drum from lifting upwardly relative to the hold-down plates.

Each hold-down plate has a tapered leading edge engageable with the drum as the drum is forced between the hold-down plates. These tapered edges act as guides for guiding and centering the drum between the hold-down plates and for camming the hold-down plates apart relative to their respective mounting plates. The plates also have a V-shaped notch spaced inwardly from the leading tapered edges so that after passage over the tapered leading edges, the drum enters into the V-shaped notches of the hold-down plate and is centered relative to the hold-down plates.

The primary advantage of the drum hold-down mechanism described hereinabove is that it is relatively inexpensive to manufacture and to add to an existing bulk melting and dispensing apparatus. Additionally, it requires no operator attention to render it operative. The mechanism automatically grips and holds the drum as a consequence of the drum being positioned onto the supporting base plate without any need for attention by an operator to actuate or trigger it.

These and other objects and advantages of this invention will become more readily apparent from the following description of the drawings in which.

Figure 1:
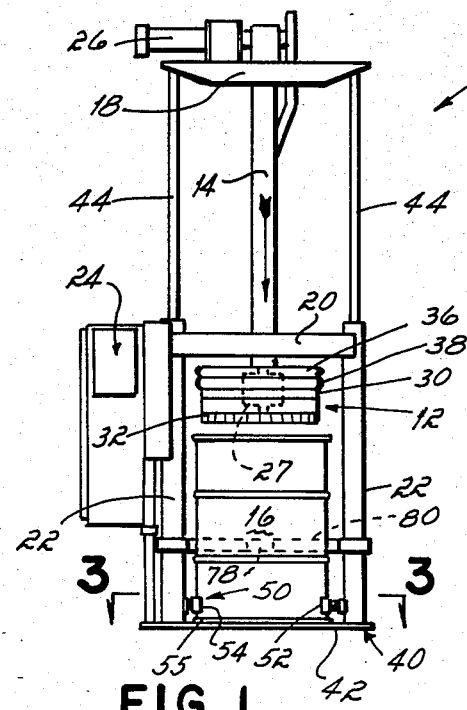
FIG. 1 is a side elevational view of a bulk melting and dispensing apparatus incorporating the invention of this application.

With reference first to FIG. 1, it will be seen that the melting and dispensing apparatus 10 of this invention includes a platen assembly 12 mounted on a central support tube 14 for insertion into the open top of a thermoplastic material containing drum 16. The support tube is carried by a frame member 18 for reciprocal movement into and out of the drum 16. Air cylinders 22 located on opposite sides of the drum 16 effect vertical reciprocation of the frame member 18 and hence the tube 14 and platen 12. Control apparatus enclosure 24 contains the necessary electrical and air controls for the unit.

Mounted on frame 18 is a motor 26 for driving a pump 27 located in the platen assembly 12. When the control means 24 is operated to actuate the cylinders 22, the frame 18 is drawn downwardly, pressing the platen assembly into the drum toward a fully lowered position, such as indicated by the frame member 18, tube 14 and platen 12 in FIG. 2.

The platen assembly 12 includes a follower 30, a heating platen 32 suspended beneath the follower 30, and the pump 27 contained internally of the lower end of the central support tube 14. The follower 30 is provided with a pair of peripheral grooves which support a pair of hollow elastomeric seals 36, 38. The seals 36, 38 engage the inside walls of the barrel or drum 16 and provide a fluid-tight seal therewith.

The platen assembly 12 is conventional and per se forms no part of the invention of this application. A more detailed and complete description of a platen assembly suitable for use in this application may be found in the above identified U.S. Pat. No. 4,073,409.

The frame 40 of the dispenser 10 includes, in addition to the frame member 18, and a frame member 20, the air cylinders 22, and a base plate 42. The cylinders 22 are fixedly secured at their lower ends to the top surface of the base plate 42 and are fixedly secured at their upper ends to the frame member 20. The piston rods 44 of the air cylinders 22 in turn movably support the frame member 18 and the central support tube 14 depending therefrom.

Figure 3:
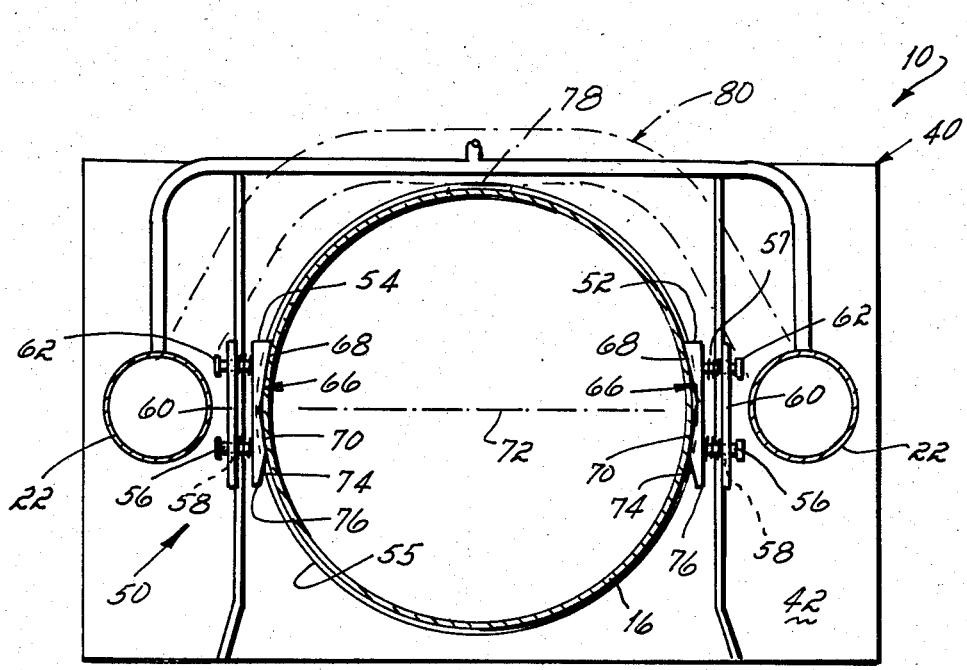
FIG. 3 is a cross sectional view as seen on line 3—3 of FIG. 2.
Figure 4:
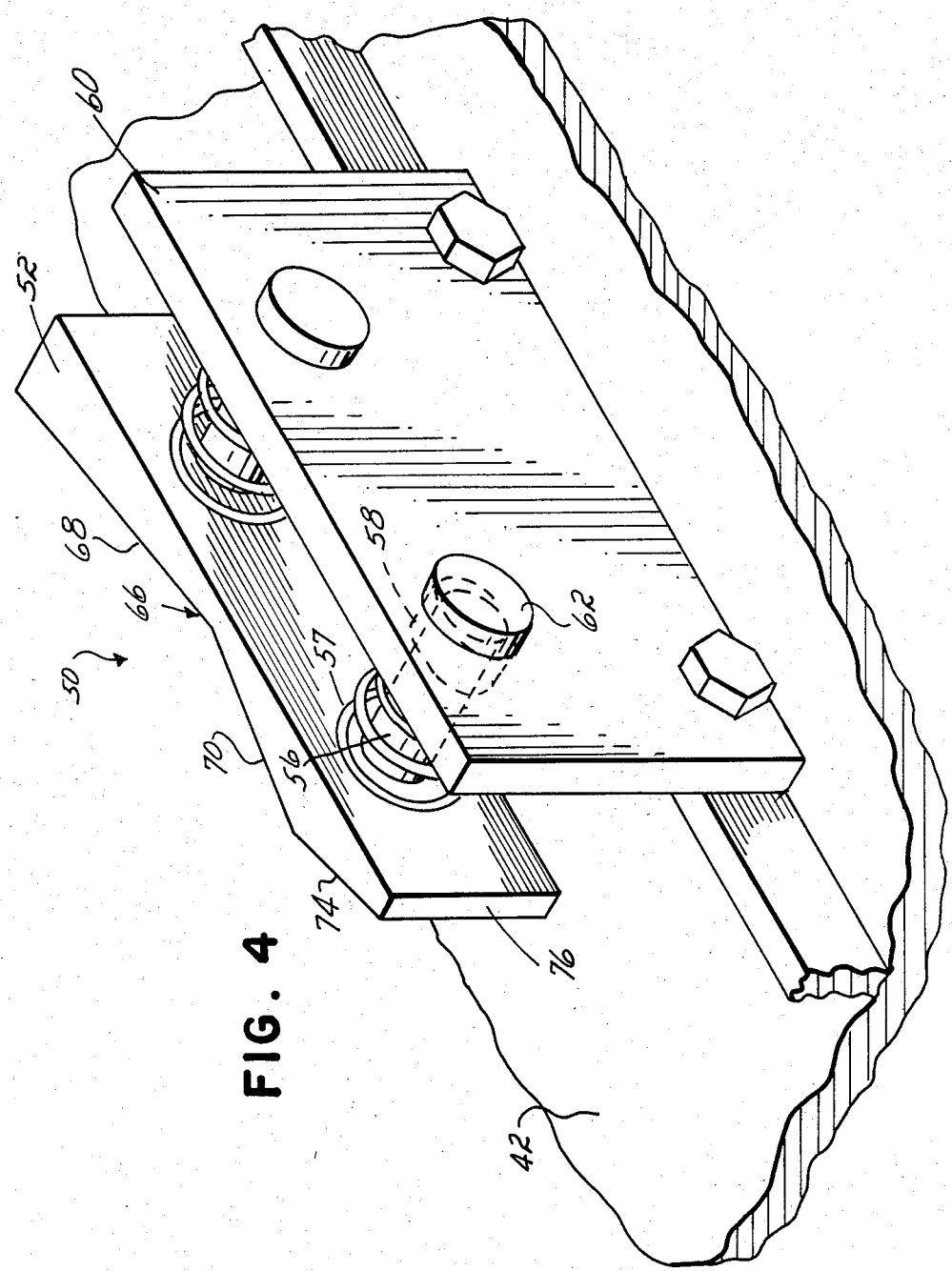
FIG. 4 is an enlarged perspective view of the hold-down mechanism portion of the apparatus of FIGS. 1-3.

As best seen in FIG. 3, a drum hold-down mechanism 50 is mounted on top of the base plate 42. This hold-down mechanism comprises a pair of drum hold-down plates 52, 54 located on opposite sides of the drum 16 and engageable with opposite sides of the drum above a lower flange 55 of the drum. Each of these hold-down plates carries a pair of supporting pins 56 which extend through holes 58 in one of a pair of mounting plates 60. The mounting plates 60 are in turn welded or otherwise fixedly secured to the top surface of the base plate 42. At the outer end each mounting plate supporting pin 56 is provided with an enlarged head 62 operative to prevent the pins from passing through and out of the holes 58 in the mounting plates 60.

A compression spring 57 surrounds each of the pins 56 and is located between the hold-down plates 52, 54 and the mounting plates 60. These compression springs bias the hold-down plates inwardly toward the vertical center line of a drum 15 supported atop the base plate 42.

With continued reference to FIG. 3, it will be seen that when viewed in top plan, each hold-down plate has a recess (which may be V-shaped as shown or take the configuration of the drum) 66 formed therein. The sides 68, 70 of these recesses 66 are located in a vertical plane and are adapted to engage the peripheral surface of a drum 16 on opposite sides of a diametral center plane 72 of a drum 16 supported on the base plate 42.

Each hold-down plate 52, 54 also is provided with a tapered leading edge surface 74 on its front side engageable with a drum as the drum is moved over the base plate 42 to a centered position beneath the platen assembly 12. These tapered surfaces 74 are located in a vertical plane and extend inwardly from the leading or front edge 76 of the hold-down plate toward the center line of a drum 16 mounted atop the base plate 42. As the drum 16 is moved over the base plate 42 into a position in which it is centered beneath the platen assembly 12, the drum is operative to engage the tapered surfaces 74 and force the follower plates 52, 54 apart against the bias of the springs. When the drum enters a centered position between the plates 52, 54, the surfaces 68, 70 of the V-shaped recess of each plate are engaged with th peripheral surface of the drum on opposite sides of the diametral plane 72. In this position of the drum, the rear edge of the drum contacts a stop 78 mounted upon an arcuate stop bar 80 which extends between the two air cylinders 22 and around the rear surface of the drum 16. This stop bar 80 not only functions as a carrier for the stop 78, but also functions to prevent a drum 15 from being loaded onto the dispenser 10 from the wrong direction, i.e. from the rear of the dispenser rather than from the front. Of course, only if the drum is loaded from the front will the drum engage the tapered surfaces 74 of the hold-down plates and cam the plates apart in the proper fashion so as to position and center the drum within the V-shaped recesses 66 of the hold-down plates 52,54.

In use of the dispenser 10, a drum 16 of solid thermoplastic material is loaded onto the base plate 42 by pushing the drum from the front to the rear of the base plate 42. As the drum moves over the surface of the base plate 42 toward a position in which the center line 72 of the drum 16 is located beneath the center line of the platen assembly 12, the peripheral surface of the drum engages the tapered leading edges 74 of the hold-down plates 52, 54 and causes those plates to be pushed or cammed apart so as to enable the drum to be moved into the V-shaped recesses 66 of the hold-down plates. When the drum is properly positioned within these recesses, the rear surface of the drum engages the stop 78 secured to the stop bar 80 of the frame. In this position of the drum, the platen assembly may be lowered into the open top of the drum so as to locate the heating platen of the drum atop the top surface of the thermoplastic material contained within the drum. The heating platen is then operative to melt the solid thermoplastic material as the platen assembly is forced downwardly into the drum by the air cylinders 22. The molten thermoplastic material is thereby forced into the inlet of the pump 27. The pump is then operative to deliver the molten thermoplastic material to a remote site or dispenser via a conduit 92 which extends between the pump and the remote site.

Figure 2:
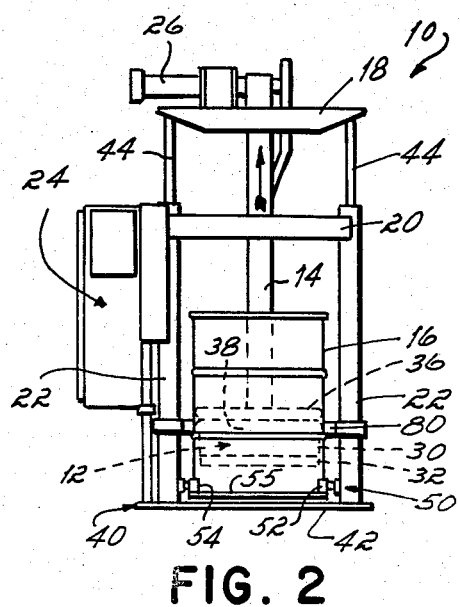
FIG. 2 is a view similar to FIG. 1 but illustrating the apparatus as the platen assembly is in the position of being raised from a drum.

As shown in FIG. 2, after the drum 16 has been emptied of thermoplastic material, or whenever it becomes desirable to lift the platen assembly from the drum, the air cylinders 22 are actuated so as to cause the platen assembly 12 to move upwardly within the interior surface of the drum. As the platen assembly lifts, the elastomeric seals 36, 38 located about the periphery of the follower 80 tend to lift the drum upwardly off the base plate 42. At this time though the lower edges of the hold-down plates 52, 54 engage the top surface of the flange 55 on the bottom of the drum and prevent the drum from lifting upwardly off of the base plate.

After the platen assembly 12 has been lifted clear of the top surface of the drum, the drum 16 may be removed from the base plate 42 by simply pushing or pulling the drum forwardly over the base plate. As the drum is pulled forwardly, the peripheral surface of the drum engages the vertical surface 70 of the V-shaped recess 66 in the hold-down plates and cams each hold-down plate outwardly toward its respective mounting plate 60. Thereby, the hold-down plates are pushed apart so as to facilitate removal of the drums from between the hold-down plates.

The primary advantage of the invention of this application is that it easily and simply avoids the tendency of the drums 16 to lift upwardly off of the base plate 42 when the platen assembly 12 is lifted out of the drum. Heretofore, it has been difficult to lift the platen assemblies clear of the drum without having to wrestle the drum off of the platen assembly. The hold-down mechanism 50 described hereinabove eliminates this manual wrestling problem with a mechanism which is simple and inexpensive and which may be easily added to existing bulk thermoplastic dispensers.

While I have described only a single preferred embodiment of my invention, persons skilled in this art will appreciate changes and modifications which may be made without departing from the spirit of my invention. Therefore, I do not intend to be limited except by the scope of the following appended claims.

I claim:

1. Apparatus for melting and dispensing solid thermoplastic material, comprising a base plate, a platen assembly mounted above said base plate, said platen assembly comprising a follower, a heating platen located beneath said follower, and a pump for pumping heated thermoplastic material from the underside of said follower, motor means mounted upon said base plate and operable to move said platen assembly downwardly into a drum resting upon the top of said base plate, a drum hold-down mechanism for preventing said drum from lifting from said base plate upon removal of said platen assembly from said drum, which hold-down mechanism comprises, a pair of mounting plates fixedly secured to said base plate, said mounting plates being located on opposite sides of said base plate, a hold-down plate movably mounted upon each of said mounting plates, spring means operable between each of said mounting plates and hold-down plates for biasing said hold-down plates inwardly toward one another, each of said hold-down plates having a generally V-shaped recess formed thereon and engageable with the peripheral surface of a drum resting atop said base plate to center said drum related to said hold-down mechanism, and each of said hold-down plates having a tapered leading edge engageable with a drum as a drum is inserted between said mounting plates, said tapered leading edges of said hold-down plates being operable as cam surfaces to force said hold-down plates apart as said drum is inserted therebetween.

* * * * *